US011107285B2

(12) United States Patent
Rakshit et al.

(10) Patent No.: US 11,107,285 B2
(45) Date of Patent: Aug. 31, 2021

(54) AUGMENTED REALITY-BASED IMAGE EDITING

(71) Applicant: International Business Machines Corporation, Armonk, NY (US)

(72) Inventors: Sarbajit K. Rakshit, Kolkata (IN); Kuntal Dey, New Delhi (IN); Pramod Vadayadiyil Raveendran, Bengaluru (IN); Saurab Basu, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 16/574,380

(22) Filed: Sep. 18, 2019

(65) Prior Publication Data
US 2021/0082188 A1 Mar. 18, 2021

(51) Int. Cl.
*G06T 19/00* (2011.01)
*G06T 11/60* (2006.01)
*G06K 9/62* (2006.01)
*G06K 9/00* (2006.01)

(52) U.S. Cl.
CPC ........ *G06T 19/006* (2013.01); *G06K 9/00624* (2013.01); *G06K 9/00671* (2013.01); *G06K 9/6267* (2013.01); *G06T 11/60* (2013.01)

(58) Field of Classification Search
CPC .......... G06K 9/00624; G06K 9/00671; G06K 9/6267; G06T 11/60; G06T 19/006
See application file for complete search history.

(56) References Cited

U.S. PATENT DOCUMENTS

| 9,106,812 | B1 | 8/2015 | Price et al. |
| 2007/0087798 | A1 | 4/2007 | McGucken |
| 2016/0358629 | A1 | 12/2016 | Pribula |
| 2017/0364752 | A1* | 12/2017 | Zhou ..................... H04R 1/326 |

(Continued)

FOREIGN PATENT DOCUMENTS

EP 3467674 A1 4/2019

OTHER PUBLICATIONS

Leake et al., Computational Video Editing for Dialogue-Driven Scenes, ACM Transactions on Graphics, vol. 36, No. 4, Article 130. Publication date: Jul. 2017.

(Continued)

*Primary Examiner* — Manuchehr Rahmjoo
(74) *Attorney, Agent, or Firm* — Garg Law Firm, PLLC; Rakesh Garg; Brian Restauro (57) ABSTRACT

A computer-implemented method that includes capturing a first image from a frame of video, analyzing the first image to create a set of artifacts, and classifying an artifact based on an attribute associated with the artifact to create an artifact class. The method also includes comparing the artifact class to a reference class, where, responsive to the comparing, a degree of correspondence is formed. The method continues with detecting a mismatch when the degree of correspondence is below a threshold degree of correspondence, generating a response indicating the mismatch, and causing, responsive to the mismatch, a content production system to change from a first setting to a second setting, the second setting causing a classification of the artifact to change to a second artifact class.

20 Claims, 8 Drawing Sheets

(56) References Cited

U.S. PATENT DOCUMENTS

2018/0321738 A1* 11/2018 Jassal ................... G06F 3/017

OTHER PUBLICATIONS

Sennaar, AI in Movies, Entertainment, and Visual Media—5 Current Use-Cases, May 19, 2019. https://emerj.com/ai-sector-overviews/ai-in-movies-entertainment-visual-media/.
High, As Hollywood taps into A.I., what will you build with IBM Watson?, Apr. 21, 2017. https://www.ibm.com/blogs/watson/2017/04/hollywood-taps-build-ibm-watson/.
Rehm, Artificial Intelligence for the Film Industry, Jul. 26, 2017. https://www.slideshare.net/georgrehm/artificial-intelligence-for-the-film-industry.

* cited by examiner

AUGMENTED REALITY-BASED IMAGE EDITING

TECHNICAL FIELD

The present invention relates generally to a method, computer program product, and system in the field of image editing. More particularly, the present invention relates to a method, computer program product, and system for augmented reality-based image editing.

BACKGROUND

Augmented reality (AR) provides a user an interactive experience of a real-world environment where artifacts that reside in the real world are enhanced by computer-generated perceptual sensory information including visual, auditory, haptic, somatosensory, and olfactory responses. The overlaid sensory information can be constructive (i.e. additive to the natural environment), or destructive (i.e. masking of the natural environment). The AR experience is interwoven with the physical world such that the user senses the overlaid sensory information as an immersive aspect of the real environment. In this manner, AR alters the user's perception of a real-world environment, in contrast to virtual reality that completely replaces the user's real-world environment with a simulated one.

The primary attribute of AR is the manner in which components of the digital world blend into a user's perception of the real world, not as a simple display of data, but through the integration of immersive sensations, which are perceived as natural parts of an environment. AR is used to enhance natural environments or situations and offer perceptually-enriched experiences. With the help of advanced AR technologies (e.g. adding computer vision, incorporating AR cameras into smartphone applications, and object or artifact recognition), the information about the surrounding real world of the user becomes interactive and digitally manipulated. Information about the environment and its artifacts is overlaid on the real world. This information can be virtual or real. Augmentation techniques are typically performed in near-real time and in semantic contexts with environmental elements. Immersive perceptual information is often combined with supplemental information such as adding music scores or text over a live video feed of a sporting event.

AR hardware devices are required to present an AR environment to a user. Typically, the hardware includes a processor, a presentation device such as a display, sensors, and input devices. A cellphone is one example or an AR device where the cellphone includes a camera that captures images and additional input devices such as accelerometers, a compass, and a GPS sensor. The AR visual environment is output to the user through the display, typically rendered using an optical projection system, a pair of AR glasses worn on the head of a user, other head-mounted displays, hand-held devices, a heads-up display (HUD), or a monitor.

Image editing is the process of altering an image. The images include illustrations, digital photographs, video, a photograph, an audio segment, text and the like. Image editing is performed for aesthetic reasons, to enhance or otherwise modify an image, to reduce or eliminate distortions and errors in an image, for artistic effects, and to add or remove artifacts in an image. Image editing was previously known as photo retouching and was conducted using artists' tools such as an airbrush. Present technology allows image editing to be performed on a computer using commercially-available software programs. Image editing is capable of adding artifacts into an image and is used by AR systems to change the visual environment experienced by a user.

SUMMARY

The illustrative embodiments provide a method, system, and computer program product. An embodiment includes a computer-implemented method that includes capturing a first image from a frame of video, analyzing the first image to create a set of artifacts, and classifying an artifact based on an attribute associated with the artifact to create an artifact class. The method also includes comparing the artifact class to a reference class, where, responsive to the comparing, a degree of correspondence is formed. The method continues with detecting a mismatch when the degree of correspondence is below a threshold degree of correspondence, generating a response indicating the mismatch, and causing, responsive to the mismatch, a content production system to change from a first setting to a second setting, the second setting causing a classification of the artifact to change to a second artifact class.

An embodiment includes a computer usable program product. The computer usable program product includes one or more computer-readable storage devices and program instructions stored on at least one of the one or more storage devices, the stored program instructions include program instructions to capture a first image from a frame of video, program instructions to analyze the first image to create a set of artifacts, and program instructions to classify an artifact based on an attribute associated with the artifact to create an artifact class. The stored program instructions also include program instructions to compare the artifact class to a reference class, where, responsive to the comparing, a degree of correspondence is formed, program instructions to detect a mismatch when the degree of correspondence is below a threshold degree of correspondence, program instructions to generate a response indicating the mismatch, and program instructions to cause, responsive to the mismatch, a content production system to change from a first setting to a second setting, the second setting causing a classification of the artifact to change to a second artifact class.

An embodiment includes a computer system. The computer system includes one or more processors, one or more computer-readable memories, one or more computer-readable storage devices, and program instructions stored on at least one of the one or more storage devices for execution by at least one of the one or more processors via at least one of the one or more memories, the stored program instructions include program instructions to capture a first image from a frame of video, program instructions to analyze the first image to create a set of artifacts, program instructions to classify an artifact based on an attribute associated with the artifact to create an artifact class, and program instructions to compare the artifact class to a reference class, where, responsive to the comparing, a degree of correspondence is formed. The stored program instructions also include program instructions to detect a mismatch when the degree of correspondence is below a threshold degree of correspondence, program instructions to generate a response indicating the mismatch, and program instructions to cause, responsive to the mismatch, a content production system to change from a first setting to a second setting, the second setting causing a classification of the artifact to change to a second artifact class.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that there is a need to identify artifacts in an image associated with video production that do not conform to the intended geographic location, time period, socio-economic period, or technology level. These artifacts include, but are not limited to the video script, video, the dialogue spoken by the characters, clothing worn by the actors, vehicles, sounds including music, and the like. For example, a video might show a character using a push button telephone before that device was invented yet. In another example, an image capturing set in the 1750's might show a character wearing denim pants.

Images disclosed herein include a video image, a photograph, an audio segment, and text such as words in a script or in literature. A frame of a video can be captured as an image using existing tools, including commercially-available software programs. Artifacts of the image are identified by characteristics associated with each image, including but not limited to shape, size, color, function, design, appearance, texture, and effect. In one example, an image contains a vehicle. The vehicle is identified as an artifact due to being a mobile machine with wheels, having a passenger area, possessing a given color and shape, and the like. The vehicle is classified into one or more classes, for example, as a vehicle, a red machine, a 1965 model, etc. In another example, an image of a hotel room set in the 1920's includes a bed and period-appropriate artwork on the walls. One artifact that is identified from the image is the wallpaper. The wallpaper is classified by its color, pattern, and condition, with other classes possible.

In use, the user wearing AR glasses scans an image capturing set or content capturing location where artifacts are identified and sent to an analyzer application residing in a processor. Using an earlier example, the vehicle is identified as an artifact and is classified based on the age and model of the vehicle. The classes are as broad or as narrow as required based on the situation and the number of possible alternative artifacts the processor can recommend. The application then compares the vehicle's classification (vehicle, age, and model) to a reference class to determine whether the vehicle matches or fails to match the desired class that is appropriate for the image capturing set as intended.

In some embodiments, the comparison between the artifact class to the reference class is based on a degree of correspondence between the two classes. In operation, the degree of correspondence is a value between 0 and 1 indicating the level of correspondence between the two classes. The level of correspondence is a measure of how acceptable a given artifact class is in relation to the reference class. Furthermore, the application uses a threshold degree of correspondence value to determine whether the artifact class is acceptable (e.g. close enough or matched) to the reference class. The threshold degree of correspondence is a reference value for use by the application in determining whether an artifact class is matched to a reference class. As an example, if the degree of correspondence is 0.6 and the threshold degree of correspondence is 0.8, the application will reject the artifact class and generate a "not matched" response. Alternatively, if the degree of correspondence value is 0.95 and the threshold degree of correspondence is 0.75, then the application will accept the artifact class as "matched" with the reference class.

When the application determined a mismatch between the artifact and the reference classes, a response is generated. In some embodiments, the response includes generating a response image that is sent to the AR glasses so that the user can see, in near-real time, alerts for mismatches in the image capturing set. In addition to scanning the image capturing set, a user wearing AR glasses can scan text, photographs, hear audio including music and speech, and the like while having the application analyze the information for mismatches. It is often the case that correcting errors during pre-production and production is much less cumbersome and ponderous that editing a video after production work is nearly over.

After a mismatch occurs, a response is generated. According to some embodiments, the response takes the form of setting a flag in the application, changing a zoom setting on a camera, moving a prop on the image capturing set, moving a camera angle, vibrating the camera, sounding an audio alarm, and the like. A response that includes a physical or audible report to alert the user of AR glasses, a camera, etc. is called a content production system and is used to notify the user of a mismatch condition with an artifact in an image. In some embodiments, the content production system sends an alert to a presentation device such as a monitor, a status panel, or a display for the user to see.

In one example, as a camera pans the image capturing set, an image captured by the camera contains an artifact identified as a flagpole. On the flagpole is a flag that fails to match the time period the image capturing set is based on. In response, the application generates a response through the content production system and notifies the camera operator and the director by vibrating the camera and ringing a bell.

In some embodiments, the mismatch causes the content production system to change from a first setting to a second setting, the second setting causing a classification of the artifact to change to a second artifact class. In an example, once the mismatch is detected, the content production system changes a flag status from inactive to active. With the flag active, the artifact is assigned to a new class and recorded for further action, such as the application suggesting to the user an alternative artifact, or recommending deleting the artifact from the image altogether.

Furthermore, using AR glasses enables a user to use the application to quickly identify an artifact that does not conform to a particular class. Classification of the attributes of an artifact aids in identifying that artifact and allows the application to tag the artifact with keywords that are easily sorted and analyzed.

Classes are predefined based on the user's requirements and needs. As an example, an expensive video production requires detailed and expansive classes while a television commercial that is 30 seconds long only requires a minimal class definition. Classes are formed from any number of methods, including but not limited to data structures, database records, a folder system, etc. Classes can include artifact associated with a specific time period, technology level, cultural aspects of a population, socio-economic level of a population, and the like. Furthermore, a class can contain information about the artifacts including an inventory or acceptable pre-approved artifacts, interdependencies between artifacts, technological level of each artifact, and the like. The scope of the classes is not limiting. Classes can also be categorized by parameters such as an acceptable time period, artifact type (vehicle, clothing, etc.), acceptable substitutes, and related artifacts selected due to the interdependency between artifacts.

The illustrative embodiments recognize that the presently available tools or solutions do not address these needs or provide adequate solutions for these needs. The illustrative embodiments used to describe the invention generally address and solve the above-described problems and other problems related to a need to identify artifacts in an image associated with video production that do not conform to the intended geographic location, time period, socio-economic period, or technology level.

An embodiment can be implemented as a software application. The application implementing an embodiment can be configured as a modification of an existing image analysis system, as a separate application that operates in conjunction with an existing image analysis system, a standalone application, or some combination thereof.

Particularly, some illustrative embodiments provide a method that sends an image to an analyzer, classifies the image, compares the image class to a reference class, and transmits a response to a pair of AR glasses for a user to see the response.

The manner of identifying an artifact using AR glasses and suggesting alternatives described herein is unavailable in the presently available methods in the technological field of endeavor pertaining to image analysis. A method of an embodiment described herein, when implemented to execute on a device or data processing system, comprises substantial advancement of the functionality of that device or data processing system in configuring an image identification and classification process where an alternative artifact is highlighted onto a pair of AR glasses.

The illustrative embodiments are described with respect to images, videos, classes, artifacts, image capturing sets, scenes, subjects, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
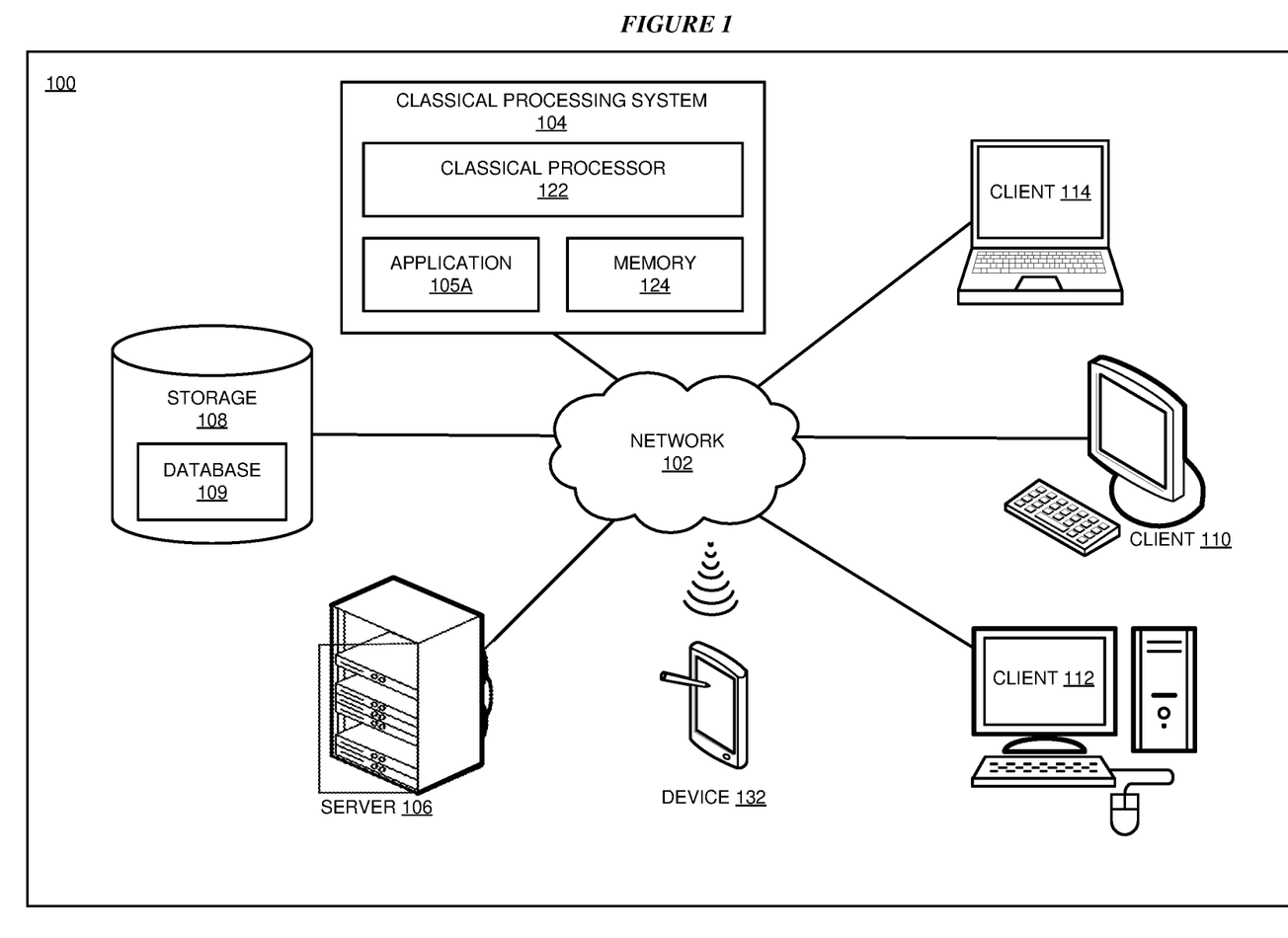
FIG. 1 depicts a block diagram of a network of data processing systems in which illustrative embodiments may be implemented.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105A implements an embodiment described herein. In one embodiment, application 105A uses client 114 to request an image from a camera associated with client 114 to transmit location data of the entity in the camera's field of view. In addition, the application 105A assigns a credibility metric value to the client 114 based at least on part on the reliability of the client 114, the inherent location accuracy of the camera associated with the client 114, the transmission speed of communications between the client 114 and the application 105A and the like.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
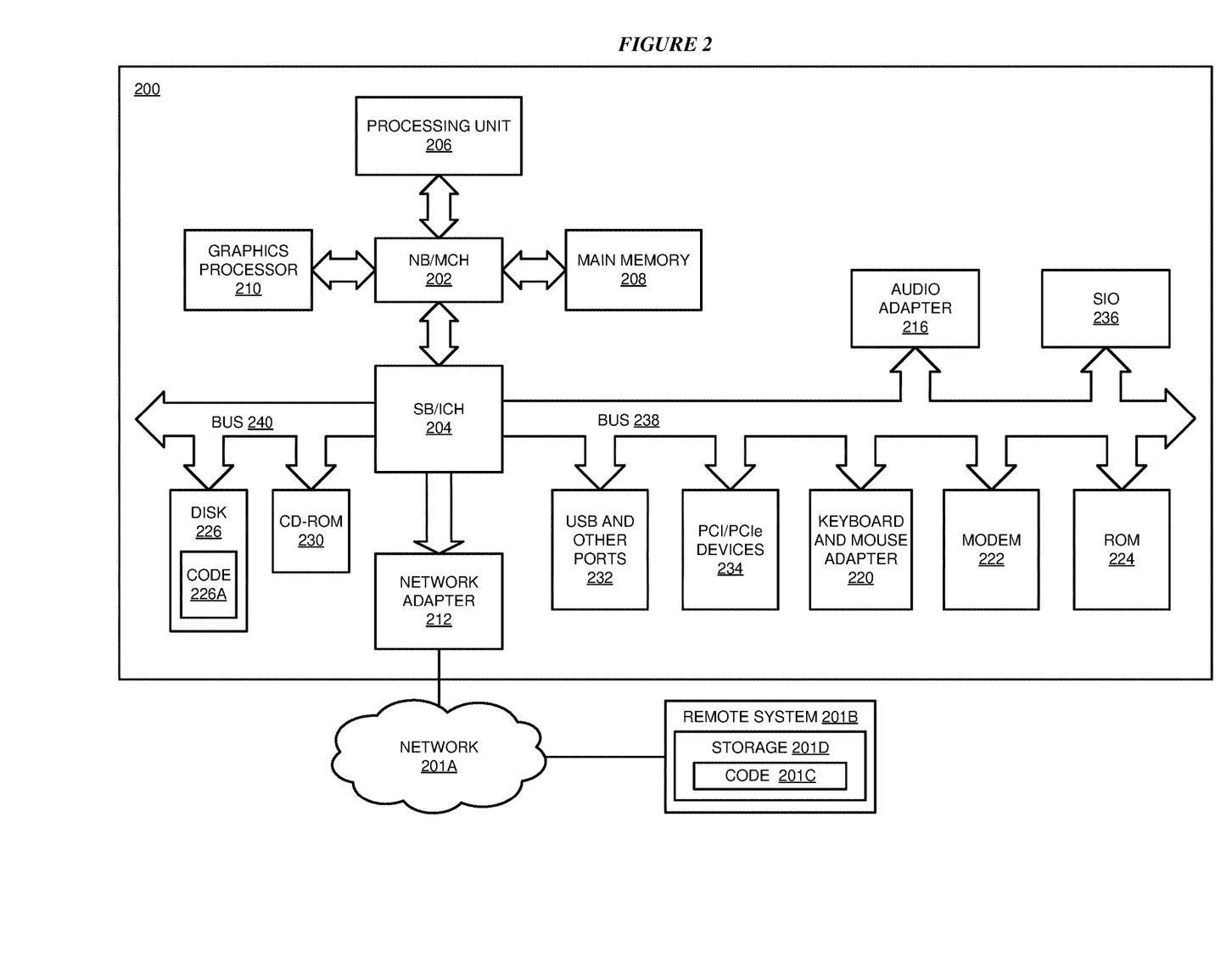
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An artifact oriented or other type of programming system may operate in conjunction with the operating system and provide calls to the operating system from programs or applications executing on data processing system 200.

Instructions for the operating system, the artifact-oriented programming system, and applications or programs, such as application 105A in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
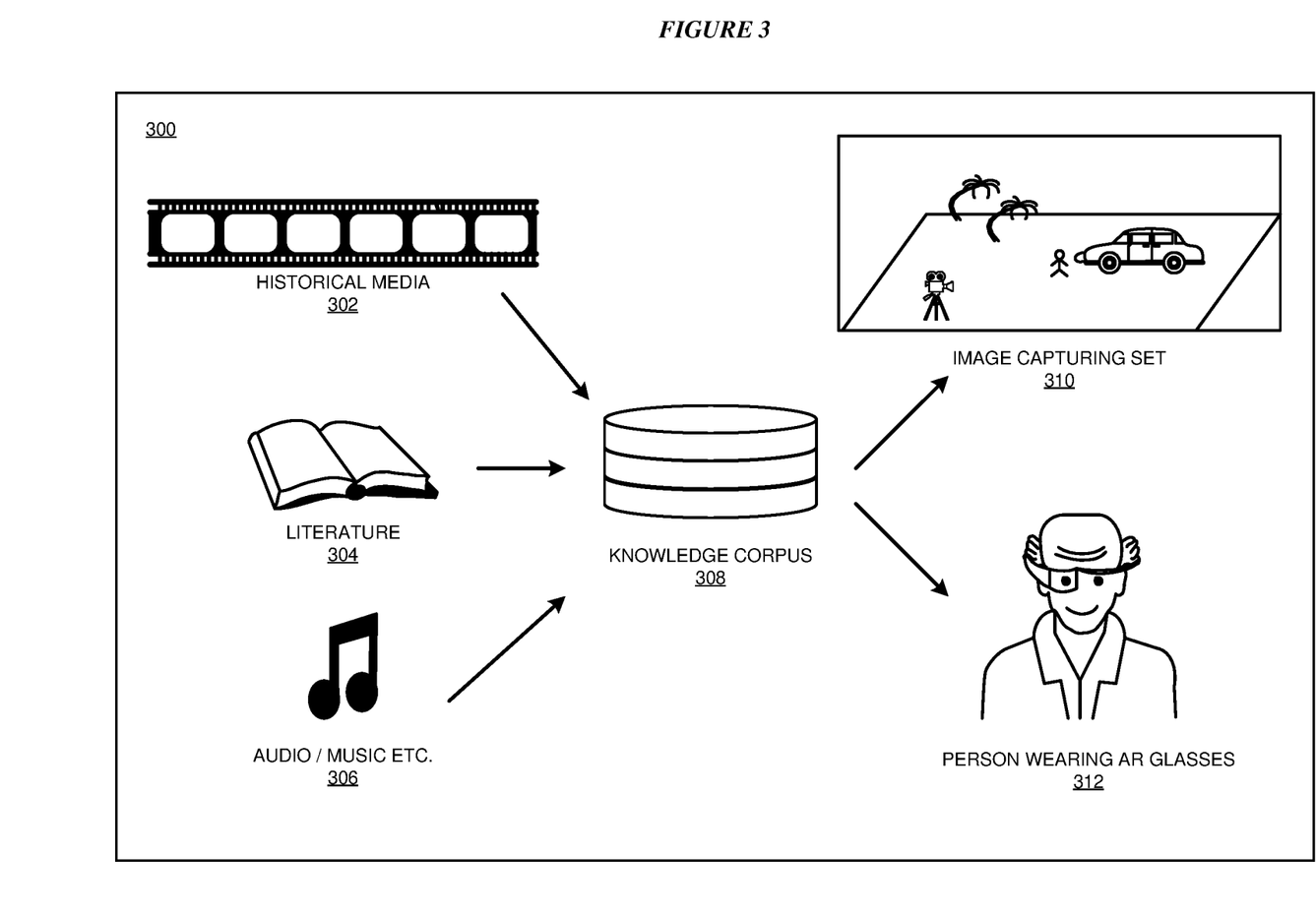
FIG. 3 depicts a functional diagram of an example user wearing AR glasses to exchange images with a knowledge corpus while on a image capturing set in accordance with an illustrative embodiment.

With reference to FIG. 3, this figure depicts a functional diagram 300 of an example user 312 wearing AR glasses to exchange images with a knowledge corpus 308 while on an image capturing set 310 in accordance with an illustrative embodiment. In some embodiments, the knowledge corpus 308 is located on a processing system such as server 106 of FIG. 1. The knowledge corpus 308 contains historical images collated from a variety of sources, including historical media 302, literature 304, and audio 306. The historical media 302 includes images, video, videos, drawings, paintings, and the like. The knowledge corpus 308 also contains information from literature 304 to include books, video scripts, production notes, handwritten notes, and the like. Audio 306 includes spoken words, music, song lyrics, and the like.

The knowledge corpus 308 is constructed using historical images as described herein. The knowledge corpus 308 is then trained by classifying each artifact by one or more of a variety of characteristics, including but not limited to geographic location, time period, socio-economic period, or technology level. Other classification characteristics are possible and are not limited by these examples. In one embodiment, a historical image of a hotel room set in the 1930's includes artifacts such as a telephone, wallpaper designs, linen on a bed, rugs and carpets, light fixtures, furniture, and the like which can all be classified by time period, location, etc. Each artifact in an image has one or more classifications assigned to it.

The knowledge corpus 308 also analyzes historical images and forms associations between artifacts to include, but not limited to, interaction patterns, surrounding context, associated artifacts, clothing styles, voice patterns, languages used, and the like. These associations also account for different classifications such as geographic location, time period, socio-economic level, and the like.

According to some embodiments, historical media 302, literature 304, and audio 306 include information on imaginary settings and locations, such as artifacts in a science fiction story set in a future time period. While termed "historical", images associated with a fictional setting can contain period-correct clothing, technology, languages, social rules, artwork, and the like to represent a fictional culture that is recognizable to fans and enthusiasts and is known as "canon" or authorized content for that setting. The knowledge corpus 308 contains information and classification of artifacts to ensure adherence to canon artifacts within the future time period.

In use, the user 312 wears a pair of AR glasses that scans the surrounding image capturing set 310 and captures images of the scene. The user 312 is a person involved with the production of a video to include reviewing the video script or other document related to the video. As the user 312 scans the image capturing set 310, the AR glasses scan the scene and send image data of artifacts in its field of view to the knowledge corpus 308. The knowledge corpus 308 then analyzes each artifact in the image and determines whether the artifact belongs in the scene based on the classification of the artifact, the intended image capturing set 310 time period, location, and the like.

In one embodiment, if the knowledge corpus 308 determines that the artifact identified in the image is correct for a given classification, the knowledge corpus 308 takes no further action. If, however, the knowledge corpus 308 determines that the artifact does not belong in a scene, a response is generated and sent back to the user 312 and thus to the AR glasses.

In some embodiments, the response includes highlighting the incorrect artifact in the AR glasses with an alert to the user 312 such as a flashing image or a redlined outline of the artifact in question. In other embodiments, the response includes an audio and visual alert to the user 312 through the AR glasses, plus the addition of an overlay of a recommended artifact, suggested by the knowledge corpus 308, that conforms to the correct classification of the image capturing set 310. In some embodiments, the response includes displaying a suggested video or image to the user 312 through the presentation device or display (e.g. AR glasses) to portray a particular gesture, recommended movement, or substitute action. Other embodiments are possible where the response is a text or email message to another user, an audio alert, etc.

Figure 4:
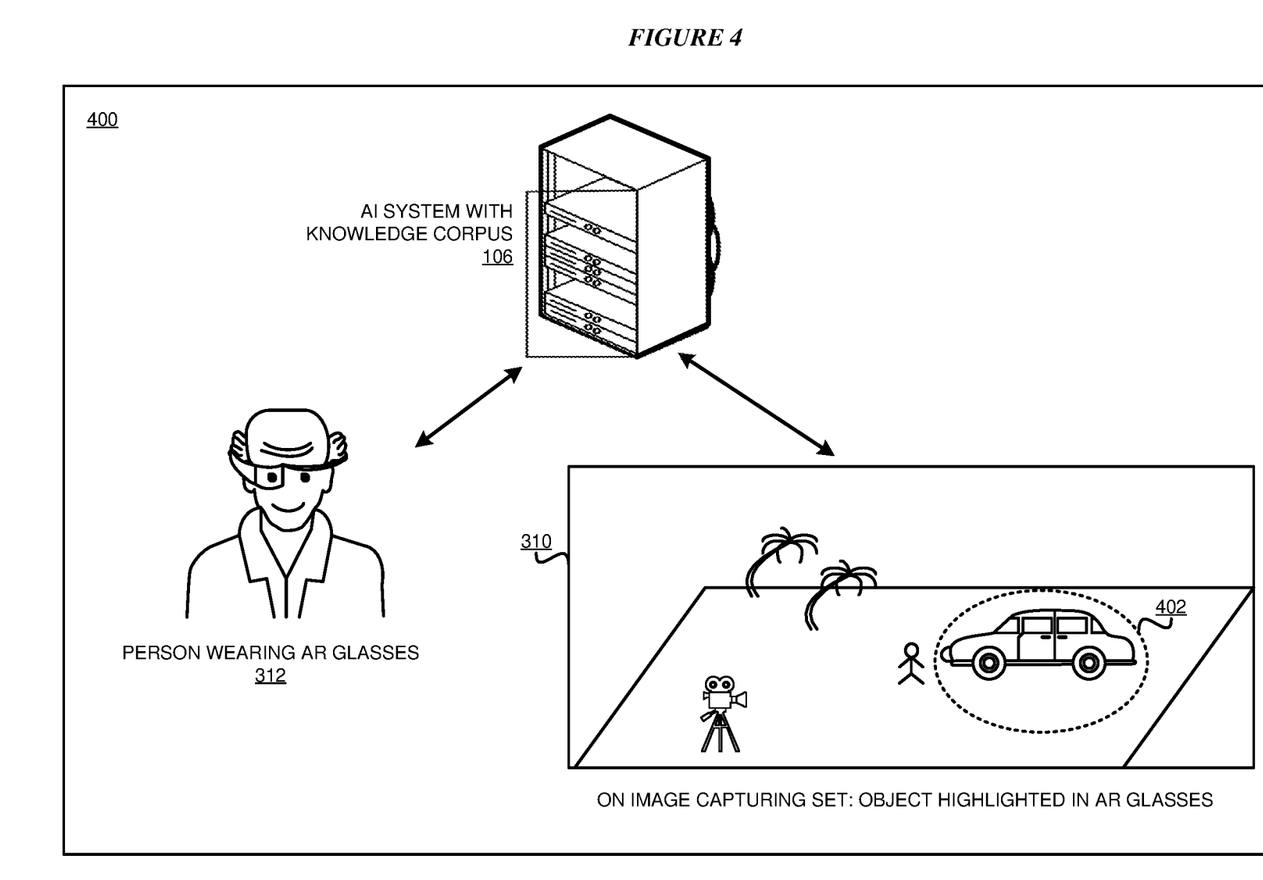
FIG. 4 depicts a functional diagram of an example knowledge corpus-based system that uses AR glasses for identifying and highlighting an artifact on an image capturing set in accordance with an illustrative embodiment.

With reference to FIG. 4, this figure depicts a functional diagram of an example knowledge corpus-based system 400 that uses AR glasses worn by the user 312 for identifying and highlighting an artifact on the image capturing set 310 in accordance with an illustrative embodiment. In some embodiments, the knowledge corpus system 400 resides on the server 106 of FIG. 1. In this example, the user 312 is the director of the video and is wearing AR glasses to survey the image capturing set 310 during filming. In use, the user 312 wears a pair of AR glasses that takes images of the image capturing set 310. As disclosed herein, the image is sent to the knowledge corpus 308 on the server 106 where artifacts in the image, such as vehicle 402, is classified and analyzed to determine whether the artifact 402 conforms to the desired classification as disclosed in FIG. 3. According to some embodiments, if the artifact conforms to the desired classification level, no further action is taken. If, however, the artifact does not conform to the desired classification level, the knowledge corpus 308 sends a response back to the user 312. In the present example, the vehicle 402 was built in a time period later than the image capturing set 310 setting and fails the classification level assigned to the image capturing set 310. The response from the knowledge corpus 308 includes highlighting the artifact, in this case the vehicle 402, in the presentation device of the AR glasses by overlaying a flashing red outline of the vehicle 402 for the user 312 to see. In some embodiments, the response includes an audio alert. In yet other embodiments, the knowledge corpus 308 overlays an alternative vehicle onto the AR glasses that conforms to the correct time period classification of the image capturing set 310.

Figure 5:
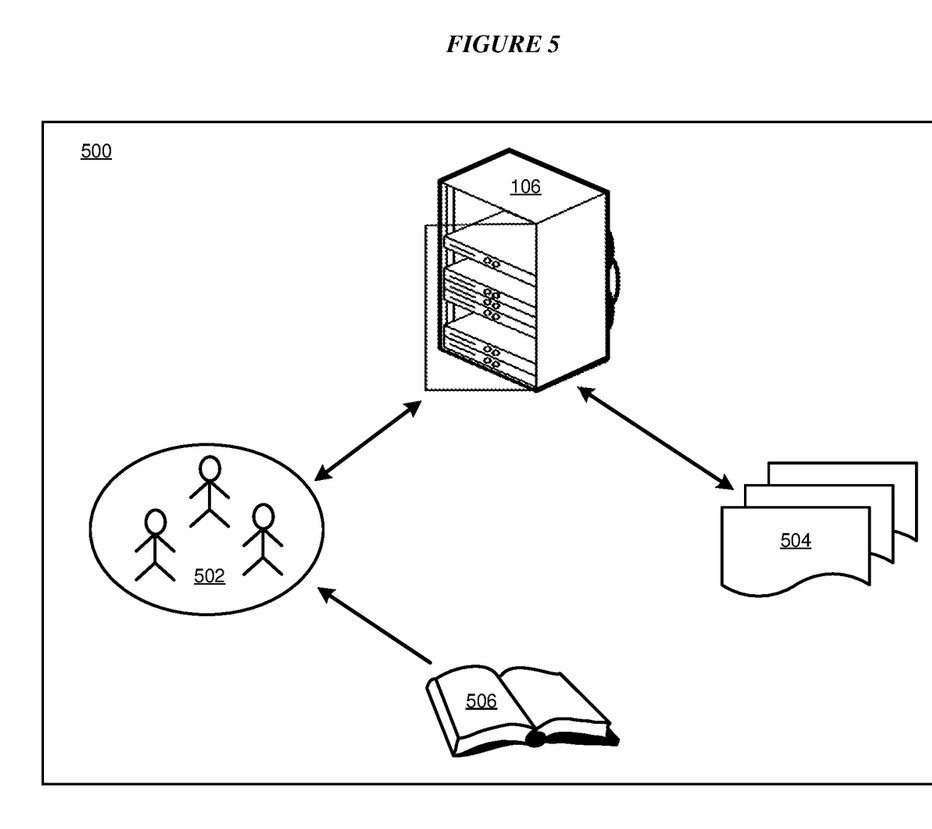
FIG. 5 depicts another functional diagram of an example AR-based system for identifying and classifying artifacts in a book in accordance with an illustrative embodiment.

With reference to FIG. 5, this figure depicts another functional diagram of an example AR-based system 500 for identifying and classifying artifacts in a book 506 in accordance with an illustrative embodiment. The book 506 represents a textbook, a video script, a historical novel, a biography, written text, and the like, and represents text-based images associated with a video production effort by a group of one or more users 502. Each user of the group of users 502 is associated with pre-production, production, or post-production of a video and are writers, directors, producers, editors, technicians, and the like who construct, set up, design, choose, or otherwise create an image capturing set for use in a video production.

In use the AR-based system 500 accesses the knowledge corpus 308 residing on the server 106. The group of users 502, each wearing AR glasses, reads the book 506. The AR glasses scan text from the book 506 and sends the image to the server 106. At the server 106, the knowledge corpus 308 analyzes each word by searching for phrases, keywords, recognized text, handwriting styles, terms of art, technology terms, quotes, historical references, and the like. Each pertinent term is classified and compared to a desired classification level to determine whether the contents of the book 506 conform to the classification level of the video as desired. If the knowledge corpus 308 on the server 106 finds discrepancies in the book 506, a response is generated and sent back to the group of users 502 through the AR glasses. In some embodiments, the response includes highlighting the phrase in question. In other embodiments, alternate phrases or words 504 are displayed in the AR glasses for the group of users 502 to review.

Figure 6:
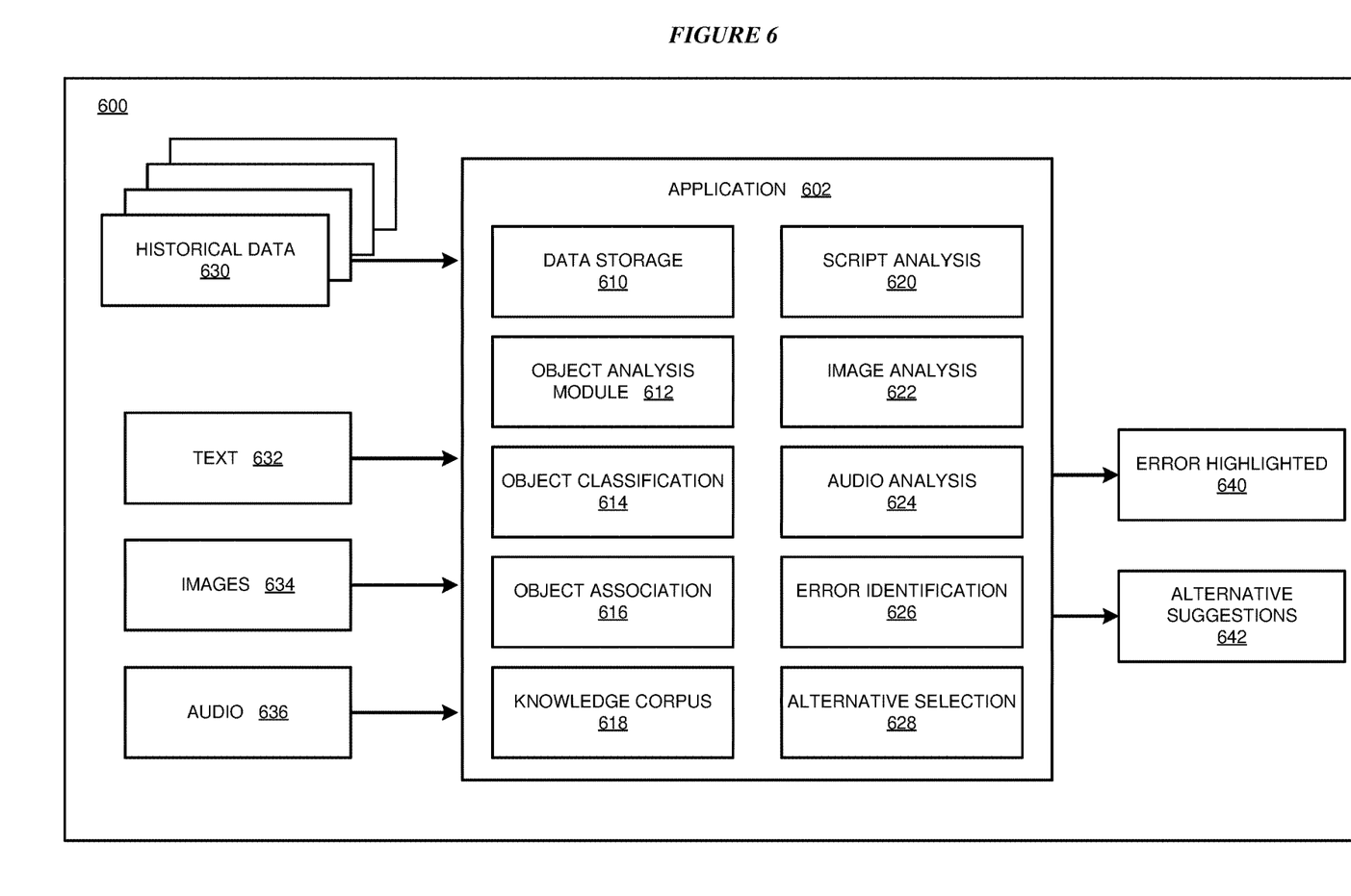
FIG. 6 depicts a functional block diagram of an example configuration for using AR-based images to identify artifacts and suggest corrections in accordance with an illustrative embodiment.

With reference to FIG. 6, this figure depicts a functional block diagram 600 of an example configuration for using AR-based images to identify artifacts and suggest corrections in accordance with an illustrative embodiment. Application 602 is an example of application 105A in FIG. 1 and executes in any of servers 104 and 106, clients 110, 112, and 114, and device 132 in FIG. 1. Application 602 includes a list of processes including data storage module 610, an artifact analysis model 612, an artifact clustering module 614, an artifact association module 616, the knowledge corpus module 618, a script analysis module 620, an image analysis module 622, an audio analysis module 624, an error identification module 626, and an alternative selection module 628. The block diagram 600 also includes as inputs historical data 630, text 632, images 634, and audio 636. The block diagram also includes outputs including highlighted errors 640 and alternative suggestions 642. This embodiment is just one example and is not limiting. Other embodiments are possible as disclosed herein.

The data storage module 610 is one embodiment of storage 108 of FIG. 1. The artifact analysis module 612 retrieves an image from the data storage module 610 and selects artifacts within the image as disclosed herein. The artifacts include text, vehicles, clothing, buildings, street signs, and the like that are examples of classification that defines the time period, geographic location, etc. of the image capturing setting. Next, the artifact clustering module 614 assigns one or more classes to each artifact identified earlier. The classes are defined beforehand by the users, such as the group of users 502 of FIG. 5, and include the intended time period, location, etc. of the video.

The artifact association module 616 forms associations and correlation between identified, but dissimilar, artifacts. As an example, a period-correct kitchen set in the 1960's should have a gas or electric stove present in the scene, as well as a tea kettle. In another example, a character in a science fiction story that is carrying a weapon should also carry a radio at the same time. The artifact association module 616 connects two dissimilar artifacts that are nevertheless often seen together.

The knowledge corpus module 618 stores the accumulated artifacts derived from images collected and forms a library of knowledge for the users to access. The knowledge corpus module accepts as inputs historical data 630 (to include fictional future story data as disclosed herein), text 632, images, and audio 636.

The application 602 includes a script analysis module 620 which accepts input from the AR glasses, identifies phrases and text associated with the video, and assigns to each text artifact one or more classes. Likewise, the image analysis module 622 and the audio analysis module 624 identifies artifacts and assigns each artifact one or more classifications. The application 602 also compares each classified image with the desired classification of the video and flags each comparison as positive or negative. If positive, no further action is necessary. If the comparison is negative, a response is generated and the group of users 502 are notified. In the present embodiment, the response includes displaying an image in the AR glasses and emphasizing the subject artifact with color, flashing symbols, and the like as a highlighted artifact 640. In some embodiments, the response also includes the application 602 generating a suggested replacement artifact using the alternative selection module 628 that creates one or more alternative suggestions 642. The alternative suggestions 642 include displaying a list in the AR glasses, overlaying the replacement artifact over the original artifact in the AR glasses, or sending audio messages detailing the alternative suggestions. Other embodiments are possible and are not limited by these examples.

Figure 7:
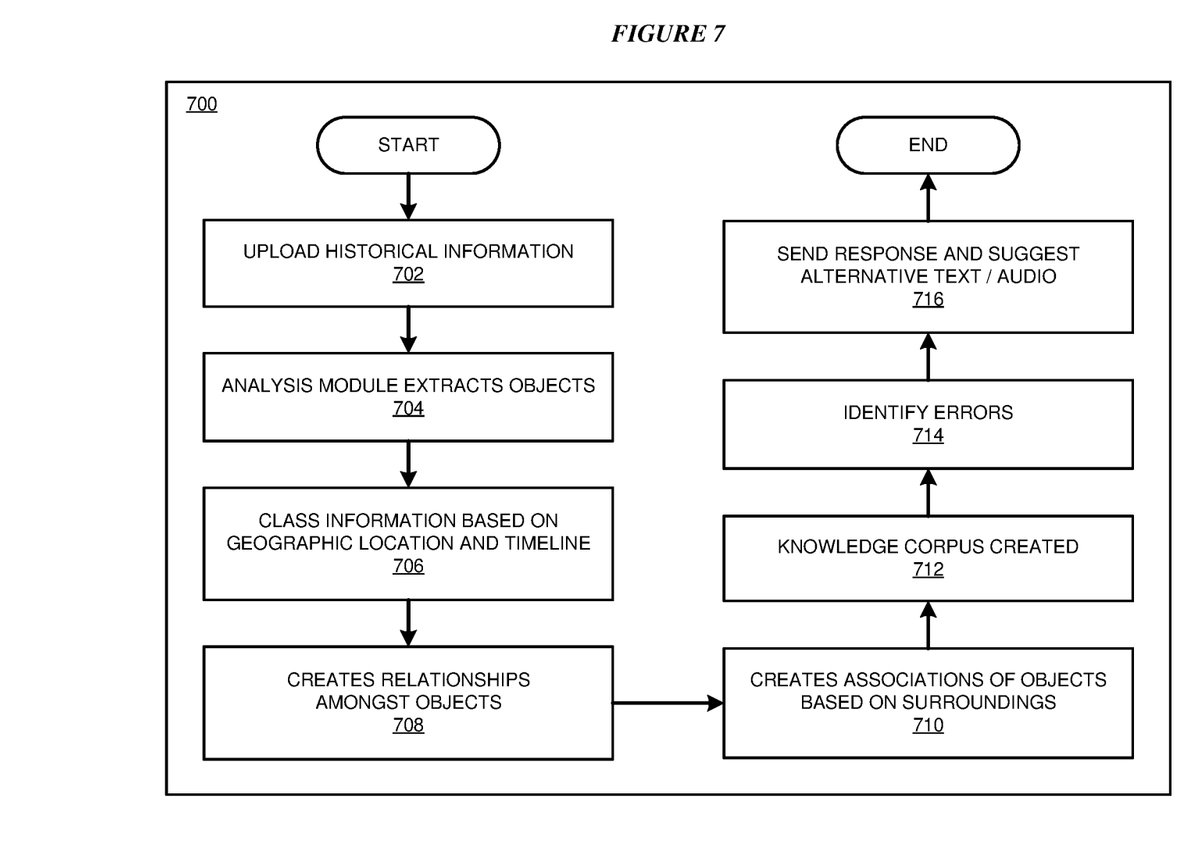
FIG. 7 depicts a flowchart of an example process for identifying and highlighting errors and offering alternatives in text and audio using AR glasses in accordance with an illustrative embodiment.

With reference to FIG. 7, this figure depicts a flowchart of an example process 700 for identifying and highlighting errors and offering alternatives in text and audio using AR glasses in accordance with an illustrative embodiment. Process 700 begins at block 702, where the application, such as application 602 of FIG. 6, receives image data containing historical information and store the information in data storage. The image data is sent by a user wearing AR glasses while on an image capturing set where spoken words, music, a script, and the like is present and in the field of view of the user wearing AR glasses. Next, at block 704, the analysis module, such as artifact analysis module 612 of FIG. 6, identifies and extracts individual artifact data from the image. Next, at block 706, the application 02 classifies each artifact according to defined classes to include geographic location, time period, technology level, and the like. Next, at block 708, the application 602 defines relationships between artifacts previously identified and classified. Next, at block 710, the application 602 defines associations and correlations between dissimilar artifacts based on the video time period, location, and the like. Next, at block 712, the application 602 identifies errors with an identified artifact and the desired video classification. Finally, at block 714, the application 602 sends the response based on the errors found and offers alternative suggestions to correct the artifacts in question.

Figure 8:
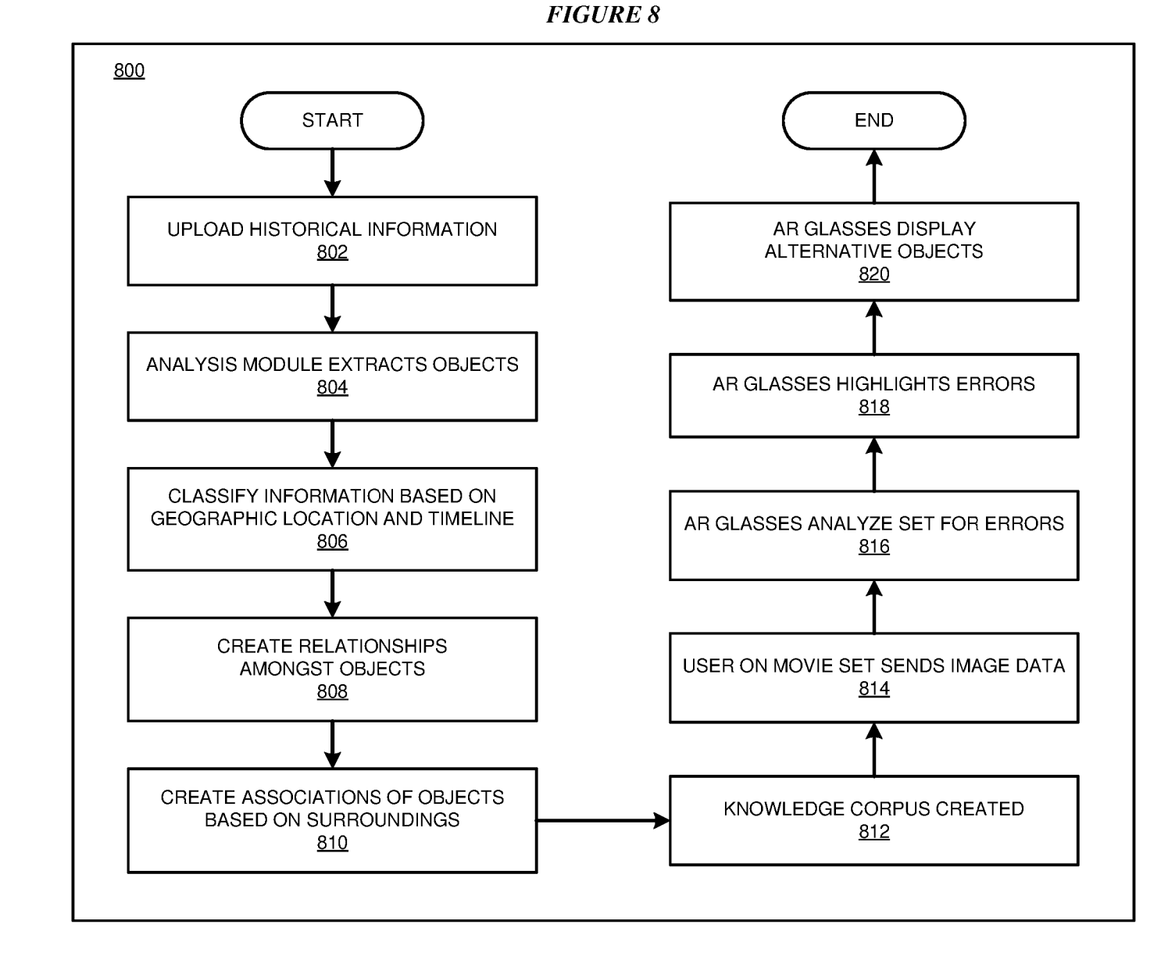
FIG. 8 depicts a flowchart of an example process for identifying and highlighting errors in video and offering alternatives using AR glasses in accordance with an illustrative embodiment.

With reference to FIG. 8, this figure depicts a flowchart of an example process 800 for identifying and highlighting errors in video and offering alternatives using AR glasses in accordance with an illustrative embodiment. Process 800 begins at block 802 where historical information is uploaded to the application 602 of FIG. 6. The historical information includes photographs, videos, video, and the like. Next, at block 804, the analysis module identifies and extracts artifacts found within the historical information and stores the artifact images in data storage. Next, at block 806, the application 602 classifies the artifacts according to location, time period, and the like. Next, at block 808, the application 602 forms relationships between identified artifacts, such as placing a tea kettle on a stove as described herein. Next, at block 810, the application 602 creates associations and correlates dissimilar artifacts according to the classification of each artifact. Next, at block 812, the knowledge corpus 308 is created based on the artifacts identified and the desired classification of the video project. Next, at block 814, the user 312 of FIG. 3 wears AR glasses on the image capturing set 310 and sends image data to the knowledge corpus 308. Next, at block 816, the knowledge corpus 308 analyzes the image and determines whether errors are present in the artifacts in the image. Next, at block 818, the knowledge corpus 308 sends a response to the user 312 and highlights the artifact in question in the AR glasses. Next, at block 820, the application 602 displays alternative suggestions as an overlay onto the artifact as viewed through the AR glasses.

Thus, a computer implemented method, computer program product, and system are provided in the illustrative embodiments for using AR glasses for image editing and other related features, functions, or operations. Where an embodiment or a portion thereof is described with respect to a type of device, the computer implemented method, computer implemented program product, or system, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or artifact code written in any combination of one or more programming languages, including an artifact oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    capturing a first image from a frame of video;
    analyzing the first image to create a set of artifacts;
    classifying an artifact based on an attribute associated with the artifact to create an artifact class;
    comparing the artifact class to a reference class, wherein, responsive to the comparing, a degree of correspondence is formed;
    detecting a mismatch when the degree of correspondence is below a threshold degree of correspondence;
    generating a response indicating the mismatch; and
    causing, responsive to the mismatch, a content production system to change from a first setting to a second setting, the second setting causing a classification of the artifact to change to a second artifact class.

2. The method of claim 1, wherein the content production system sends an alert to an augmented reality display.

3. The method of claim 1, further comprising creating a second image comprising a first reference artifact overlaid onto the first image and sending the second image to a presentation device.

4. The method of claim 1, wherein the content production system sends a response to a presentation device.

5. The method of claim 1, wherein the response comprises creating a third image emphasizing the artifact, wherein emphasizing comprises a subset of a set comprising highlighting the artifact, causing the artifact to blink, and creating an outline around the artifact.

6. The method of claim 1, wherein the image comprises a subset of a set of data comprising a video image, a photograph, an audio segment, and text.

7. The method of claim 1, wherein the artifact class comprises a subset of a set of attributes comprising geographic location, cultural aspects of a population, elements of a time period, technological level, and elements of a socio-economic level.

8. The method of claim 1, wherein the artifact is analyzed based on a subset of a set of characteristics comprising shape, size, color, function, design, appearance, texture, and effect.

9. The method of claim 1, further comprising selecting, by a user, a replacement artifact to replace the artifact in a second image, wherein the replacement artifact comprises an attribute of the reference class.

10. The method of claim 1, further comprising defining interdependencies between reference artifacts of the reference class, wherein a first reference artifact is associated with a second reference artifact.

11. A computer usable program product, comprising one or more computer-readable storage devices and program instructions stored on at least one of the one or more storage devices, the stored program instructions comprising:
    program instructions to capture a first image from a frame of video;
    program instructions to analyze the first image to create a set of artifacts;
    program instructions to classify an artifact based on an attribute associated with the artifact to create an artifact class;
    program instructions to compare the artifact class to a reference class, wherein, responsive to the comparing, a degree of correspondence is formed;
    program instructions to detect a mismatch when the degree of correspondence is below a threshold degree of correspondence;
    program instructions to generate a response indicating the mismatch; and
    program instructions to cause, responsive to the mismatch, a content production system to change from a first setting to a second setting, the second setting causing a classification of the artifact to change to a second artifact class.

12. The computer usable program product of claim 11, wherein the stored program instructions is computer usable code stored in a computer-readable storage device in a data processing system, and wherein the stored program instructions are transferred over a network from a remote data processing system.

13. The computer usable program product of claim 11, wherein the stored program instructions is computer usable code stored in a computer readable storage device in a server data processing system, and wherein the computer usable code is downloaded over a network to a remote data processing system for use in a computer readable storage device associated with the remote data processing system.

14. The computer usable program product of claim 11, wherein the presentation device comprises an augmented reality display.

15. The computer usable program product of claim 11, further comprising program instructions to create a second image comprising a first reference artifact overlaid onto the first image and sending the second image to the presentation device.

16. The computer usable program product of claim 11, further comprising program instructions to define interdependencies between reference artifacts of a reference class, wherein a first reference artifact is associated with a second reference artifact.

17. The computer usable program product of claim 16, further comprising program instructions to create a second image comprising the first reference artifact and the second reference artifact overlaid onto the first image.

18. A computer system comprising one or more processors, one or more computer-readable memories, one or more computer-readable storage devices, and program instructions stored on at least one of the one or more storage devices for execution by at least one of the one or more processors via at least one of the one or more memories, the stored program instructions comprising:
    program instructions to capture a first image from a frame of video;
    program instructions to analyze the first image to create a set of artifacts;
    program instructions to classify an artifact based on an attribute associated with the artifact to create an artifact class;
    program instructions to compare the artifact class to a reference class, wherein, responsive to the comparing, a degree of correspondence is formed;
    program instructions to detect a mismatch when the degree of correspondence is below a threshold degree of correspondence;
    program instructions to generate a response indicating the mismatch; and
    program instructions to cause, responsive to the mismatch, a content production system to change from a first setting to a second setting, the second setting causing a classification of the artifact to change to a second artifact class.

19. The computer system of claim 18, wherein the presentation device comprises an augmented reality display.

20. The computer system of claim 18, further comprising program instructions to create a second image comprising a first reference artifact overlaid onto the first image and sending the second image to the presentation device.

* * * * *